R. W. KENNEDY.
AGRICULTURE IMPLEMENT.
APPLICATION FILED JUNE 16, 1917.
1,255,428. Patented Feb. 5, 1918.
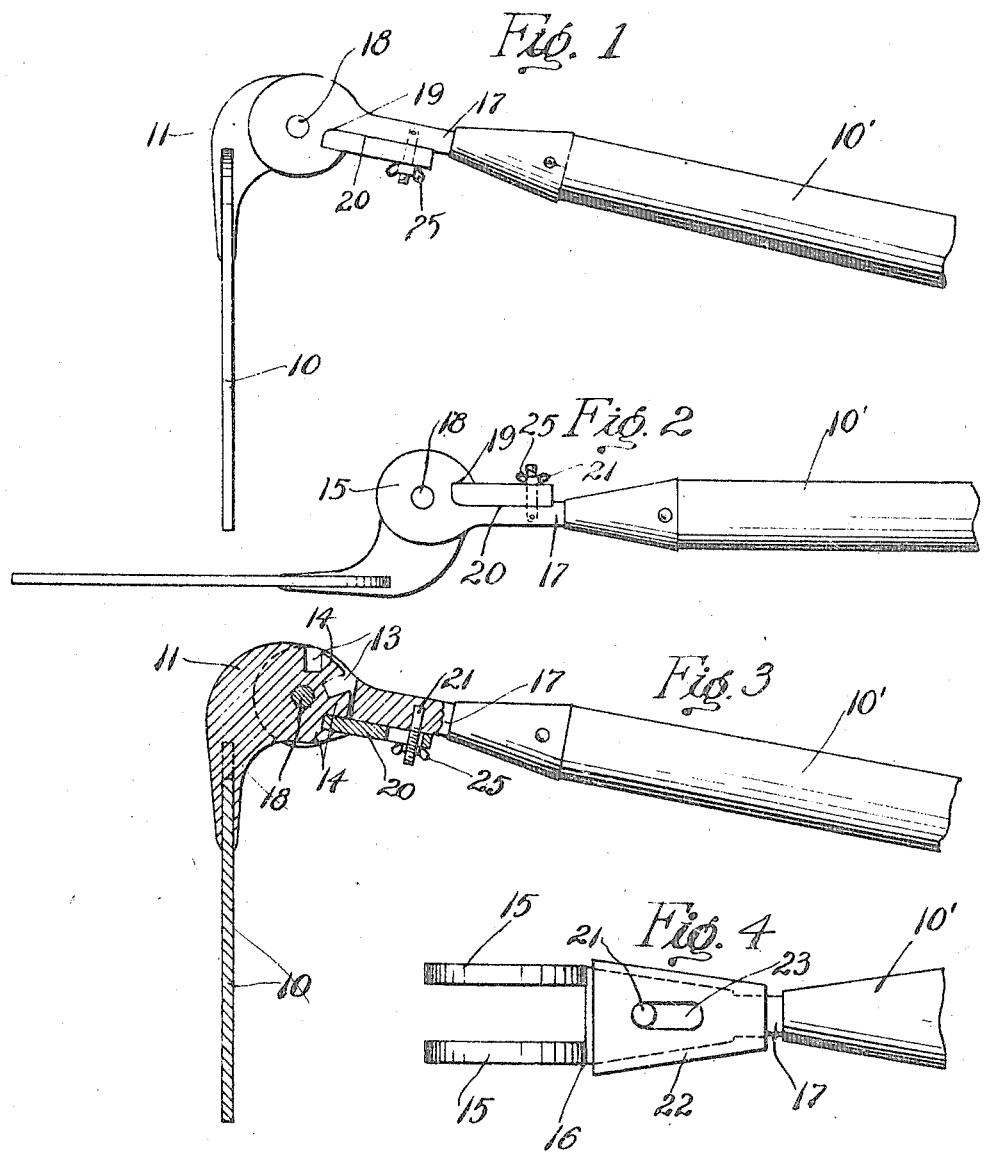

UNITED STATES PATENT OFFICE.

RICHARD WILLIAM KENNEDY, OF LOS ANGELES, CALIFORNIA.

AGRICULTURE IMPLEMENT.

1,255,428.  Specification of Letters Patent.  Patented Feb. 5, 1918.

Application filed June 16, 1917. Serial No. 175,203.

*To all whom it may concern:*

Be it known that I, RICHARD WM. KENNEDY, a citizen of the United States, residing at Los Angeles, in the county of Los Angeles, State of California, have invented certain new and useful Improvements in Agriculture Implements; and I do hereby declare the following to be a full, clear, and exact description of the invention, such as will enable others skilled in the art to which it appertains to make and use the same.

This invention relates to new and useful improvements in agriculture implements, and has for its primary object to provide an implement which may be used either as an ordinary digging hoe, a scuffling hoe, or a device for trimming lawn edges or the like.

A further object of the invention is to provide a device of this character in which the blade is securely held in each of its adjusted positions.

Referring to the drawings,

Figure 1 is a side elevation of the device in one of its adjusted positions.

Fig. 2 is a similar view of the device in another of its adjusted positions.

Fig. 3 is a section taken vertically through the forward portion of the implement, the handle portion being mainly in elevation.

Fig. 4 is a detail view.

Referring more particularly to the drawings the device comprises a blade 10 which is of approximately the same size as an ordinary digging hoe, and rigidly secured to the top edge of the blade 10 there is a rigid shank 11 the upper end of which is angularly disposed, and is provided with a curved edge.

The angularly disposed end of the shank 11 is provided with a plurality of notches 13, which form a plurality of projecting lugs 14.

The handle 10 is provided on its lower end with a plurality of spaced ears 15, said ears being formed by bifurcating the enlarged portion 16 of the tine or the like 17 which is adapted to be inserted into the lower end of the handle 10.

These ears 15 are perforated as at 18 and on the periphery near the body portion of the member 17 these ears are notched as at 19, and said member 17, is provided adjacent said notches with a flat face 20. Projecting from said flat face 20 there is a screw bolt 21, and embracing the sides of the members 17, and slidably mounted on said screw bolt 21 there is a locking member 22 which is provided with an elongated slot 23 which permits of sliding movement of the locking member 22, and threaded on the screw bolt 21 there is a wing nut 25 which is adapted to retain the lock member 22 against movement.

The angular end of shank 11 is adapted to lie between the ears 15, and is adapted to be retained against movement relatively to the handle by means of the sliding member 22 which engages in the notches between the lugs or projections 14.

By this construction it will be seen that when the winged nut 25 is loosened, and the sliding member 22 disengaged with the lugs 14 of the angular shank, that the blade may be moved relative to the handle to adjust the same to the position in which it is desired to use it, and that by again engaging the sliding member with the lugs 14, the blade will be locked against movement relative to the handle member 10.

Having thus described the invention what is claimed is,

A device of the character described comprising in combination, a blade, an angular shank projecting from the top edge of said blade, and provided with a plurality of notches, a handle, a pair of spaced ears provided with oppositely disposed notches, said notches being adapted to register with the notches in the shank, means carried by the handle and slidable into the notches of the spaced ears for engagement with one of the notches of the shank to prevent relative movement between the blade and the handle and means carried by the handle for locking the shank engaging means against movement relative to the handle.

In testimony whereof, I affix my signature in the presence of two witnesses.

RICHARD WILLIAM KENNEDY.

Witnesses:
 RAY STURGE,
 B. P. GLENN.